United States Patent [19]
Beirle et al.

[11] Patent Number: 6,045,009
[45] Date of Patent: Apr. 4, 2000

[54] ROTARY VALVE

[75] Inventors: Walter Beirle, Ravensburg; Ewald König, Zussdorf; Kurt Pfeifer, Salem-Beuren, all of Germany

[73] Assignee: Waeschle GmbH, Weingarten, Germany

[21] Appl. No.: 09/233,447

[22] Filed: Jan. 20, 1999

[30] Foreign Application Priority Data

Jan. 20, 1998 [DE] Germany .......................... 198 01 747

[51] Int. Cl.$^7$ ............................................ G01F 11/10
[52] U.S. Cl. .............................................. 222/368; 414/220
[58] Field of Search ..................... 222/368, 478; 414/219, 220

[56] References Cited

U.S. PATENT DOCUMENTS

| | | | |
|---|---|---|---|
| 4,823,993 | 4/1989 | Siegel et al. | 222/368 X |
| 5,114,053 | 5/1992 | Bierle | 222/368 X |
| 5,544,995 | 8/1996 | Ogawa et al. | 222/368 X |
| 5,906,297 | 5/1999 | Cole | 222/368 X |

FOREIGN PATENT DOCUMENTS 4135593A  5/1993  Germany .

*Primary Examiner*—Gregory L. Huson
*Attorney, Agent, or Firm*—Burns, Doane, Swecker & Mathis, LLP

[57] ABSTRACT

The present invention relates to a rotary valve for conveying and metering bulk material into a pneumatic conveying conduit. Exemplary embodiments include a housing with a supply opening, a discharge opening and a cellular wheel supported rotatably about a substantially horizontal axis within a cavity of the housing. The cellular wheel rotates in a predetermined direction of rotation so that as some of its cells move upward, other cells move downward. The housing has at least one venting opening for venting the upward moving cells, the venting opening being arranged before the supply opening when seen in the direction of rotation. A perimeter of the at least one venting opening lies on a peripheral wall of the housing and has a plurality of recesses which extend in a direction towards the cellular wheel when the latter rotates in the direction of rotation.

5 Claims, 4 Drawing Sheets

A-A

ROTARY VALVE

FIELD OF THE INVENTION

The invention relates to a rotary valve for conveying and metering bulk material into a pneumatic conveying conduit, comprising a housing with a supply opening or chute, a discharge opening or chute and a cellular wheel supported rotatably about a substantially horizontal axis within a cavity of the housing in which at least one venting opening for venting the upward moving cells is arranged before the supply opening when seen in direction of rotation of the cellular wheel.

BACKGROUND OF THE INVENTION

A rotary valve of this kind is known from DE-A-41 35 593, the disclosure of which is hereby incorporated by reference in its entirety. The housing according to this document has a slot-like venting opening before the supply opening when seen in direction of rotation of the cellular wheel. Through this venting opening, leakage air from the upward moving cells void of bulk material is discharged, thus relieving the cells to the pressure prevailing in the supply opening or chute in order not to impede renewed supply of bulk material.

In order to prevent a relief of the cells in a sudden burst and to diminish noise emissions from the operating rotary valve, the lower edge of the perimeter of the venting opening situated on the peripheral wall of the cavity of the housing is slightly arrow-shaped to the longitudinal axis of the cellular wheel so that the relief of the cells, when the cellular wheel is rotating, is effected through a free cross-section of the venting opening which enlarges upon rotation of the wheel and communicates increasingly with the cell to be relieved.

Such a construction leads to satisfying results only with rotary valves which convey the bulk material against a relatively low pressure difference (3.5 bar for example), because the free cross-section of the venting opening enlarges quite quickly, when the cellular wheel rotates, thus causing a relief burst if the counter-pressure is high.

SUMMARY OF THE INVENTION

It is an object of the present invention to provide a rotary valve of the kind described in such a way that leakage air can be discharged from the upward rotating cells of the cellular wheel free of bulk material without causing much noise, even if the valve operates at a high counter-pressure.

This object is achieved according to exemplary embodiments of the invention in that the perimeter of the venting opening(s), being arranged on the peripheral inner wall of the cavity, has a plurality of recesses which extend in a direction against a rotating cellular wheel's direction of rotation.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
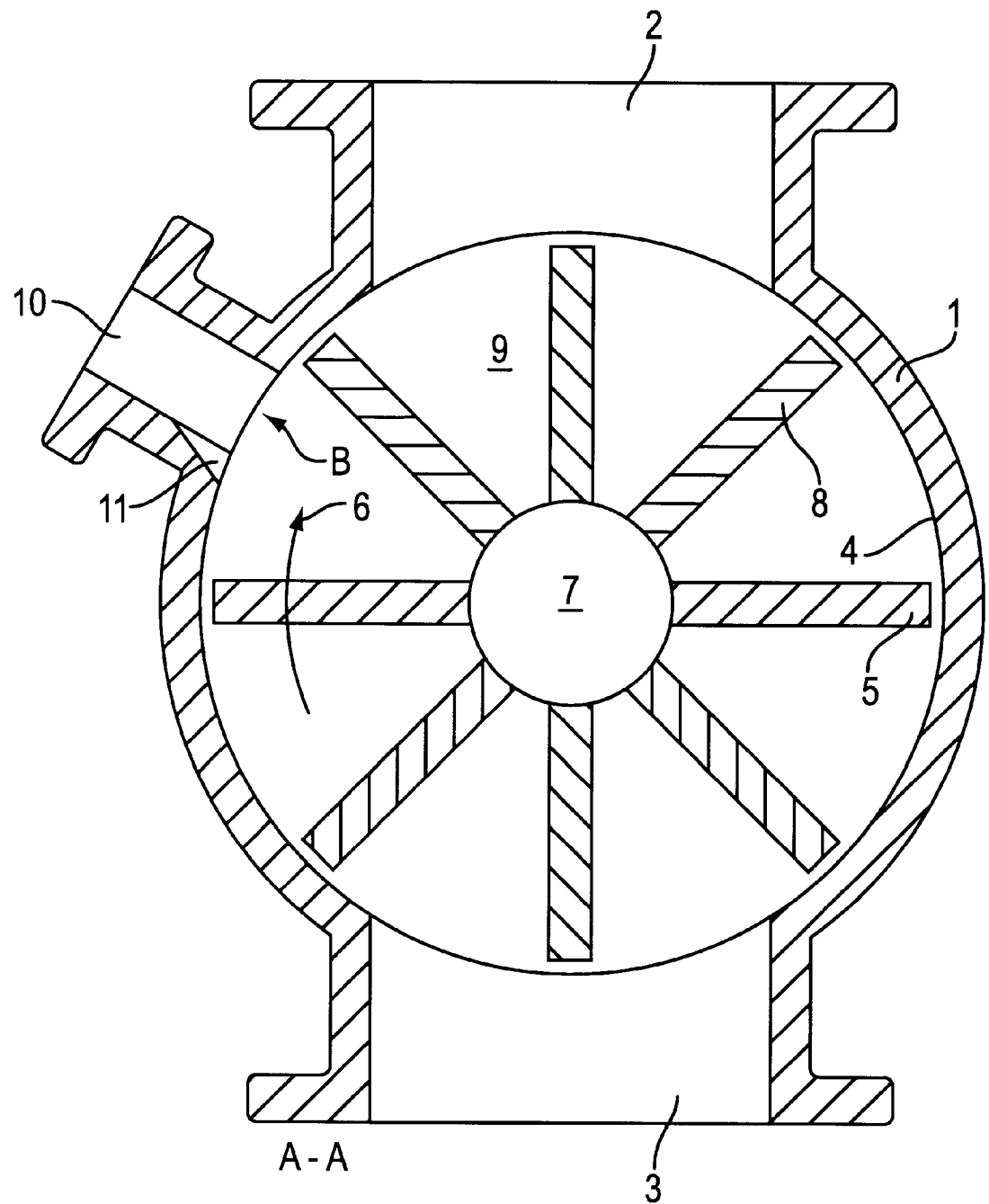
FIG. 1 is a cross-sectional view of an exemplary rotary valve according to the invention along a median plane A—A of FIG. 2 or FIG. 3.

A rotary valve, as illustrated in FIG. 1, comprises a housing 1 having a supply chute 2 for feeding bulk material into the housing 1, and an outlet chute 3 for discharging the bulk material. A cavity 4 of the housing 1 has a substantially cylindrical inner wall surface defining the periphery of the cavity 4 when seen in the cross-sectional view of FIG. 1. However, it will be understood that although the lateral portions of this inner surface, when seen in FIG. 1, are circular in cross-section, this is not necessarily the case in the upper and lower region. Moreover, the inner surface which defines the cavity 4, although circular in cross-section, can have the shape of a truncated cone. In any case, a cellular wheel 5 is supported rotatably about an axis defined by a central shaft 7, which extends preferably, but not necessarily, in a substantially horizontal direction, and which has a direction of rotation indicated by arrow 6. The cellular wheel 5 has a number of partition webs 8 connected to the shaft 7 in a star-like configuration when seen in cross-section and forming individual cells 9. The webs 8 are shown to extend straight in radial directions, but can have any other shape as is known to those skilled in the art.

When the shaft 7 extends in horizontal direction, the respective upper-most cell 9 takes a volume of bulk material from the supply chute 2 subjected to a relative low air or gas pressure, as compared with that prevailing in the discharge chute 3. This volume taken out of the supply chute 2 will correspond in the most favorable case to the volume of a cell 9. When the filled upper-most cell 9 of the cellular wheel 5 then rotates in the direction of arrow 6, it moves downwards with respect to the shaft 7 about its axis of rotation (right side of FIG. 1) and reaches the opening of the discharge chute 3 which is subjected to a relatively high air or gas pressure in comparison with that of the supply chute 2. In this position, the bulk material filling the respective cell 9 is discharged from the cell by gravity (or by any other means, if the shaft 7 is not horizontal), and is replaced by a corresponding volume of air or gas under high pressure (e.g. of at least approximately 1 bar, but being, preferably much higher, such as 3 bars or more). This amount of high pressure gas, when the cell 9 moves up again (left side of FIG. 1), would expand as soon as the cell 9 reaches the supply chute 2, and would impede refilling of the cell 9 with bulk material.

Therefore, a venting opening 10 is arranged before the supply chute 2 (when seen in the direction of rotation according to arrow 6), the venting opening connecting the cavity 4 either with the atmosphere or with a container (not shown), particularly one which feeds bulk material into the supply chute 2 so as to replace the volume of bulk material discharged from this container by a corresponding volume of air or gas and to maintain a substantially uniform pressure in this container. In any case, the surplus of gas from the cell 9 will be discharged through the venting opening 10 so that subsequently bulk material can be filled unimpededly into the respective cell 9.

Figure 2:
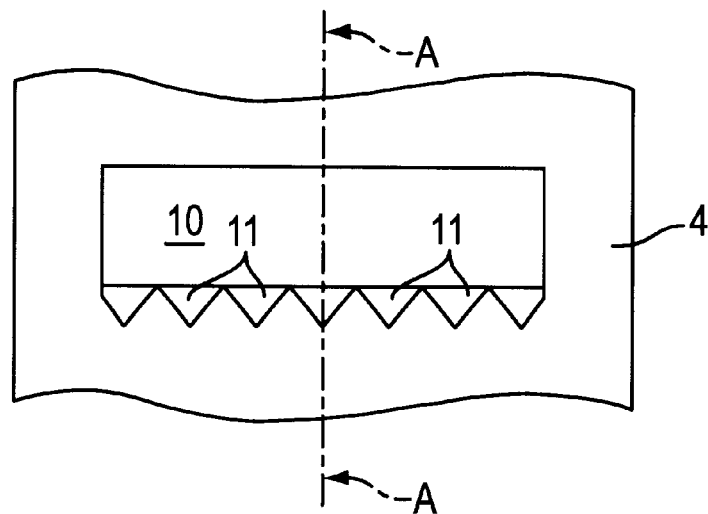
FIG. 2 is a front view in the direction of arrow B of FIG. 1 showing the perimeter of the venting opening situated on the inner wall surface of the housing's cavity of the rotary valve according to an exemplary embodiment of the invention.
Figure 3:
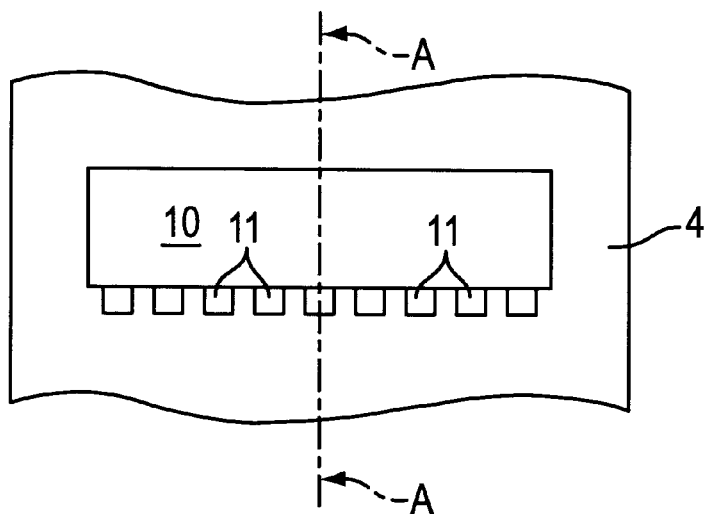
FIG. 3 is a view similar to FIG. 2, but showing an alternate embodiment of the invention.

As particularly shown in FIG. 2 or FIG. 3, the venting opening 10 has a perimeter situated in the peripheral inner surface of the housing 1 which defines the cavity 4. The venting opening 10 has a plurality of recesses 11 opposite the cells 9 and their partition webs 8, which extend in a direction against a predetermined direction of rotation of the cellular wheel such that the partition webs 8, during rotation of the cellular wheel 5 in its predetermined direction of rotation, first reach the recesses 11 and then reach the rest of venting opening 10. In other words, the recesses 11 extend in a direction against the direction of rotation of the cellular wheel 5 when the latter rotates in its direction of rotation according to arrow 6 (FIG. 1). Thus, the respective upper web 8 of a cell 9 under high air or gas pressure (left side of FIG. 1) will first open into the lower section of the recesses 11 so that part of the pressure can be relieved into the venting opening 10 under controlled conditions. The rest of the leakage gas pressure will be relieved, as the upper web 8 passes the cross-section of the venting opening 10 to free the opening. Therefore, it will be apparent to those skilled in the art that, although the basic cross-section of the venting opening 10 is shown in FIG. 2 and FIG. 3 to be substantially rectangular, it could assume any cross-section convenient for a given application. For example, the venting opening 10 can also be an arrow-shaped one where the tip of the arrow would point in downward direction, and wherein recesses 11 are located at the downward end of the arrow-shaped venting opening. In any case, however, recesses 11 in the lower perimeter of the venting opening 10 would allow gradual expansion of the gas pressure prevailing in a cell 9.

According to FIG. 2, the recesses 11 can, at least in part, be wedge-shaped in cross-section, with tips of triangular cross-sections pointing downwards to form a vertex. This results in a particularly gentle pressure relief when the cross-section is passed by a web 8 moving upwards with respect to FIG. 2, since the cross-sectional area increases gradually. This would, of course, also be the case if the delimiting surfaces of the FIG. 2 recesses 11 do not have a strictly triangular configuration in cross-section, but are somewhat rounded, especially at the top and bottom of the respective triangle, so that they assume a wavy appearance. Such an embodiment is particularly preferred in cases where the cellular wheel 5 is driven with different rotational speeds. The gradually enlarging cross-section of the recesses 11, and, thus, of the venting opening 10 according to FIG. 2 takes, in particular, the shortened venting periods into account when the cellular wheel 5 rotates with relatively high speed.

However, the cross-sectional shape of the recesses 11 is not so limited. For example, the recesses 11 of the venting opening can be rectangular so that, as the wheel 5 rotates, they will be opened first giving way for a partial pressure relief, before the whole cross-section of the venting opening 10 is freed. This is particularly useful in cases where the cellular wheel 5 rotates at a substantially uniform speed.

Different geometric shapes of the recesses 11 can, of course be used. For example, the wavy shape mentioned above, or a step-like shape along an inclined lower delimiting edge of the venting opening 10 can be used. The most favorable shape will depend on the respective volume of the cells for a given application and the conditions of operation of the rotary valve (which encompass particularly, the rotational speed, the pressure gradient between the supply opening and the discharge opening or the type of the pressurized gas used). For further diminishing noise, the lower edges of the recesses 11 which are situated on the inner wall surface of the cavity 4 can be rounded with the basic cross-section of the recesses forming, for example, a triangle, a rectangle, a square or any other desired shape.

Figure 4:
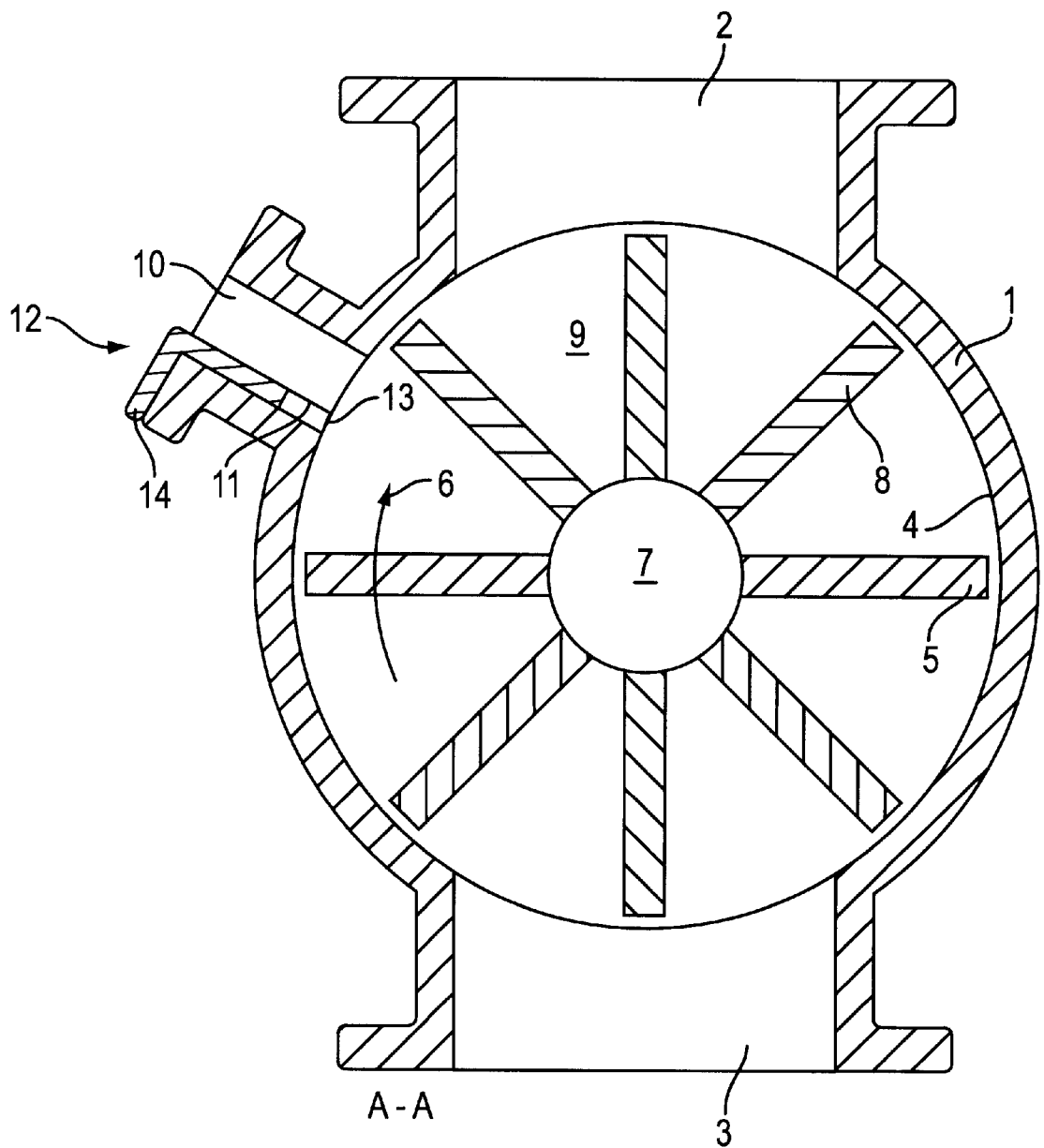
FIG. 4 is a cross-sectional view similar to FIG. 1, but of another embodiment, taken along the median plane A—A of FIG. 2 or FIG. 3.

In the rotary valve according to FIG. 4, the recesses 11 are formed by an angular insert 12 partially recessed, for example, in the manner shown in FIG. 2 and FIG. 3, at its front surface 13 and inserted into an existing venting opening 10. In the embodiment shown, the insert 12 can be fastened to the housing 1 by screws (not shown) penetrating a leg 14 and an adjacent wall of the housing 1. In this way, the venting opening 10 can be formed with a simple geometry (for example, rectangular geometry or any other desired shape) favorable for casting the housing 1, after which the insert 12 is mounted. A later adaptation of the shape of the recesses to the operational conditions of a rotary valve can provide a simplified manner of optimizing the recesses.

Figure 5:
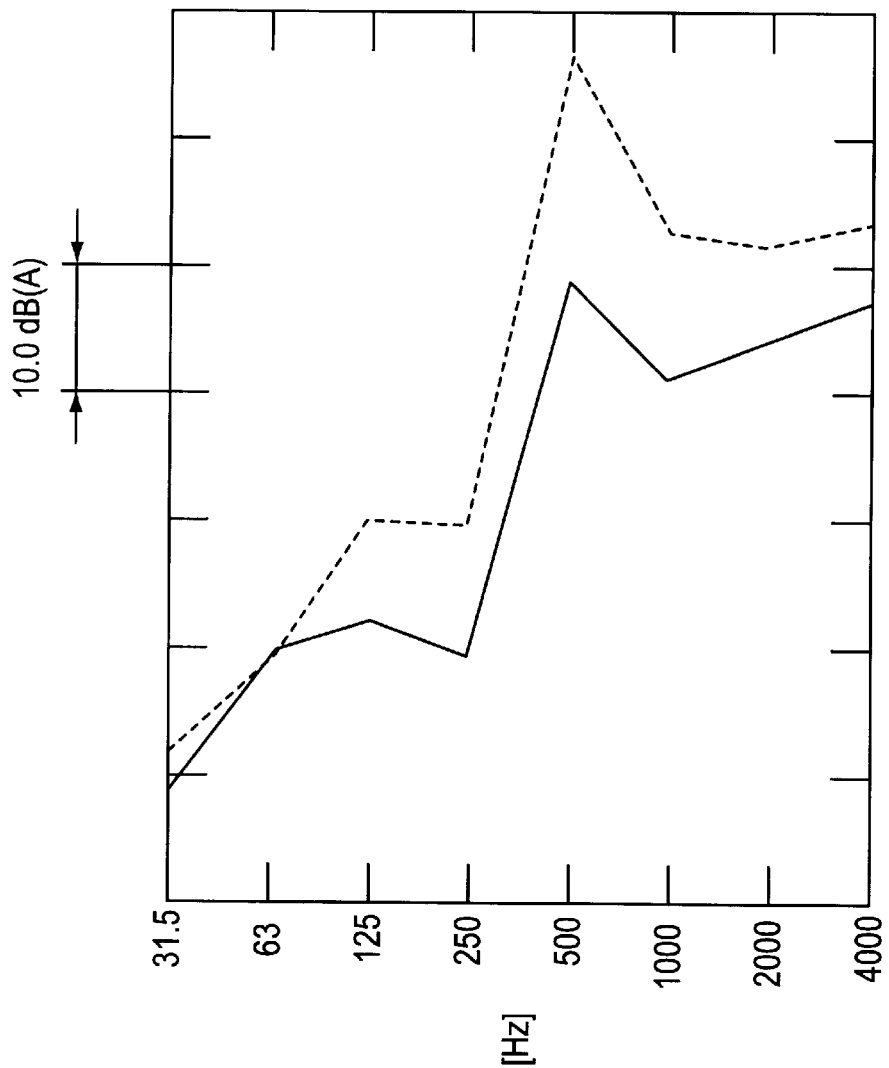
FIG. 5 is an exemplary plot of sound pressure measurement of a common rotary valve, but supplemented with an insert according to exemplary embodiments of the invention.

From the plot of FIG. 5, one can see an exemplary effect of a venting opening according to exemplary embodiments of the invention. The acoustic power of the noise caused by a rotary valve according to the invention due to expansion of high pressure air or gas, as explained above, is shown on the ordinate axis, while the frequency spectrum is shown on the abscissa.

The measuring curve shown in interrupted lines shows the sound emission of a high pressure rotary valve (at a counter-pressure of 6 bar) having a venting opening according to the prior art (for example, that of DE-A-41 35 593), while the measuring curve in continuous lines illustrates a course of frequency dependent sound emission of a venting opening (such as that of the German document) which was supplemented with an insert 12. The insert 12 had a width of 410 mm and a plurality of recesses at its lower edge (i.e. eighteen rectangular recesses 11 according to FIG. 3 having a width of 10 mm and a depth of 4 mm each). It is apparent that in this way a considerable reduction in sound emissions are achieved especially at medium frequencies of, for example, 125 to 1000 Hertz [Hz], with small expenditure.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A rotary valve for conveying and metering bulk material into a pneumatic conveying conduit, comprising:

a housing having a cavity defined by an inner wall surface of at least partially circular cross-section, and a supply opening leading to said cavity, and a discharge opening connecting said cavity with an exterior of said housing;

a cellular wheel supported for rotation about an axis in a predetermined direction within said housing and said cavity, and including a plurality of cells distributed around said axis such that upon rotation of said cellular wheel some of said cells move upward and others of said cells move downward with respect to said axis of rotation; and at least one venting opening of a predetermined perimeter for venting said upward moving cells, said venting opening being arranged in said housing before said supply opening when seen in said direction of rotation, said predetermined perimeter being arranged on said inner wall surface and having a plurality of recesses which extend in a direction against said predetermined direction of rotation.

2. Rotary valve as claimed in claim 1, wherein at least a part of said recesses is wedge-shaped so as to form a vertex when seen in cross-section, said vertex pointing against said predetermined direction of rotation.

3. Rotary valve as claimed in claim 1, wherein at least a part of said recesses is rectangular in cross-section.

4. Rotary valve as claimed in claim 1, wherein at least a part of said recesses is wavy in cross-section.

5. Rotary valve as claimed in claim 1, further comprising:
insert means having a front surface configured to face said cavity and to be inserted into said at least one venting opening to form at least part of said plurality of recesses, said insert means being recessed partially at said front surface.

* * * * *